United States Patent Office 3,067,085
Patented Dec. 4, 1962

3,067,085
PROCESS FOR BONDING VINYL COPOLYMER TO NYLON FABRIC
George Limperos, Wilmington, Del., assignor to E. I. du Pont de Nemours and Company, Wilmington, Del., a corporation of Delaware
No Drawing. Filed Jan. 17, 1958, Ser. No. 709,465
1 Claim. (Cl. 156—327)

This invention relates to adhesive compositions and to laminated structures bonded with adhesives, particularly to those structures in which fibrous bases or textiles are laminated to vinyl resins such as polymers of vinyl halides or copolymers of vinyl halides with vinyl esters of carboxylic acids, and more particularly to coated fabrics in which the fabric is made from continuous filament synthetic fibers.

For many purposes it is desirable to have a composite structure in which a fibrous base or textile is combined with a resinous or elastomeric material. The base contributes largely to mechanical properties such as resistance to rupture, tear, distortion and the like, and the resinous or elastomeric material provides impermeability to liquids and gases, resistance to abrasion, light, solvents, and other deteriorating environmental influences and also contributes to the aesthetic qualities of hand, drape, surface texture, luster, color, and degree of transparency. The fibrous or textile component must be firmly and permanently bonded to the resinous or elastomeric component since any separation destroys the utility of the whole. As examples of such structures and their uses, coated and combined fabrics are widely used as protective clothing and footwear, protective covers for boats, machinery, trucks and outdoor storage, for automobile tops, tents, awnings, collapsible tanks and ventilation ducts, as well as for utilitarian and decorative upholstery, panels, book binding, and other uses. In many cases the immediate use is temporary and the covering is moved from place to place making it highly desirable for the composite structure to be as light as possible and at the same time to be highly resistant to damage in handling.

The vinyl resins, particularly those which are polymers of vinyl halides or copolymers of vinyl halides with vinyl esters of carboxylic acids, suitably chosen and compounded with plasticizers, pigments, and other ingredients, have been widely used as the resinous component of such structures. However, those compositions which have the most desired service and appearance characteristics generally do not adhere well to the fibrous or textile base, particularly when made of synthetic fibers. It has frequently been necessary to compromise in the selection of such resinous compositions and to accept less desirable resinous properties in order to obtain acceptable adhesion.

When using bases which are fiber batts, felts, or fabrics made from spun yarns such as cotton fabrics which provide a large area for attachment, a sufficiently good bond can be obtained together with useful resinous properties. More recently attempts have been made to use fabrics made from synthetic fibers and particularly from continuous filament synthetic fibers to take advantage of the light weight, low gauge, high strength, and dimensional stability offered by them. The vinyl resin compositions do not adhere well to such fibers, and the problem of good bonding with good properties has become much more acute. The use of open weaves which permit the resin to strike through the fabric for mechanical entanglement or to merge with a second coating on the other side of the fabric has had some success, but there are severe limitations, and at best adhesion is not good.

An object of this invention is to provide an improved adhesive for bonding fibrous bases and textiles to resin compositions. A further object is to provide laminated or coated structures comprising fibrous bases and polyvinyl resins having improved adhesion between the components. A further object is to provide such a laminated or coated structure in which the fibrous base or textile is composed primarily of synthetic fibers. A still further object is to provide such structures having good adhesion in which the textile base is made of continuous filament synthetic fiber yarns and the polyvinyl resin composition may have a wide range of color, transparency, and mechanical properties. Other objects will appear hereinafter.

These objects are accomplished by providing an adhesive comprising an organic polyfunctional isocyanate (more than one —N=C=O group) monomer and a copolymer of vinyl chloride, a vinyl ester of a carboxylic acid, and an alpha, beta unsaturated carboxylic acid or a derivative thereof having at least one free acid group. The invention also comprises the steps of applying said adhesive to a fibrous base and curing at an elevated temperature. The invention further comprises the steps of applying said adhesive to a fibrous base, curing, placing a resinous compound in conjunction with the adhesive surface and bonding the assembly together. The objects of this invention are also accomplished by providing an article comprising a non-woven batt, felt, or paper-like structure, the fibers of which are bonded together by means of the above-described adhesive. The objects of the invention are further accomplished by providing an article comprising a fibrous base, an adhesive as described above attached to said fibrous base, and a resinous compound attached to said adhesive.

The fibrous base used in practicing this invention may be a non-woven web, batt, felt, or paper-like structure, in which one function of the preferred adhesive is to bond the fibers together to make a firm and coherent article. It is often desired to coat such a bonded structure with a resinous composition and in such cases the adhesive also acts to form a strong bond between the fibrous base and the resinous coating compound. Alternatively, the fibrous base may be a woven or knitted fabric in either open or tight construction and made with spun yarns or continuous filament yarns of those natural or man-made fibers which are not damaged by the materials and conditions used in operating the invention. The invention is particularly useful when employing closely woven fabrics made of continuous filament synthetic fiber yarns.

The isocyanate compound which is one constituent of the adhesive may be any diisocyanate, triisocyanate, or similar polyfunctional isocyanate monomer which is compatible with the solvents and plasticizers used in the operation of this invention. Methylene-bis(4-phenyl isocyanate) is an exemplary isocyanate.

The vinyl copolymer which is the second constituent of the adhesive is a terpolymer comprising a major proportion of combined vinyl chloride, the remainder comprising a vinyl ester of a carboxylic acid and an alpha, beta olefinic unsaturated carboxylic acid. For example, it may be a copolymer of 86% vinyl chloride, 13% vinyl acetate, and 1% maleic acid. Such a copolymer is available from the Bakelite Co., a Division of Union Carbide Corp. under the name of vinyl resin VMCH. It is necessary that the alpha, beta olefinic unsaturated acid be chemically combined with the vinyl chloride and the vinyl ester and that at least one of the carboxyl groups in the polymer be a free acid group. The combination of such a polymer with an isocyanate is designated herein as the adhesive or adhesive composition.

The resinous composition which is bonded to the fibrous base by means of the adhesive may be chosen from those vinyl polymer compositions having touch, rubbery and abrasion resistant characteristics together with flexibility and resistance to solvents. For instance, the resin constituent may be primarily a copolymer of 95% vinyl chloride and 5% vinyl acetate having a molecular weight of about 24,000. It may be desirable to include a lesser amount of a vinyl chloride-vinyl acetate copolymer containing about 90% vinyl chloride and of a lower molecular weight. It is generally desirable to include plasticizers, for instance di(2-ethyl hexyl) phthalate, stabilizers and lubricants. Color and a suitable degree of opaqueness are frequently important, and this may be controlled by the addition of pigments or other colorants. It will be understood that such formulations may vary widely depending on the end use of the final product, and the proper choice of ingredients and methods are well known to those skilled in the art. Such compositions are often applied to fibrous bases by calendering a film directly on the fibrous base and also by preforming a film by calendering or casting and applying this film to the fibrous base in a separate operation utilizing heat and pressure. Alternately such a composition may be prepared as a plastisol or an organosol and applied to the fibrous base in that form before heating to form a film.

To demonstrate the advantages of this invention in the following examples, a difficult condition for adhesion is illustrated, namely the bonding of a closely woven fabric of filament nylon to preformed films using a variety of vinyl resin compounds. The VMCH resin described above is used in the adhesive. A second resin, VYNS, which is a copolymer of vinyl chloride and vinyl acetate having solubility characteristics similar to those of VMCH but which does not contain an unsaturated carboxylic acid copolymerized therewith is used in other examples for comparison. Unless otherwise stated, the fiber base was a woven continuous filament nylon fabric weighing 5 oz. per sq. yard, made from 840 denier nylon and having 23 warp ends and 21 filling picks per inch.

A conventional method of determining the degree of adhesion between a fibrous base and a resinous compound film of a laminate has been to start a separation by rubbing, picking, or other manipulation in a strip of determined dimensions, to clamp the fibrous base in one jaw and the separated film in the other jaw of a tensile testing device, and then to strip the film from the fibrous base while measuring the force applied. This method is successful where bond strength is less than the film strength. In the practice of this invention bond strength generally is greater than the film strength, and quantitative adhesive strength must be determined using two layers of fibrous base separated by a resinous coating film compound so that one layer of the fibrous base can be clamped in each jaw of the testing device and in stripping, the resinous film separates from one of these layers while being supported by the other.

To compare the adhesive strength of known adhesives when measured under the conditions used in evaluating the adhesives of this invention, the following examples are presented.

The above-described nylon fabric is laminated directly, without adhesive, to each of a series of seven preformed vinyl resin films in which the vinyl resin is at least 98% vinyl chloride and in which the compounding ingredients and pigments are varied to provide clear, colored, and opaque products. Lamination is accomplished by pressing the fabric and the film together at a pressure of 100 pounds per square inch and a temperature of 163° C. for two minutes. Adhesion test samples are prepared by cutting each laminate in half, placing the vinyl film faces together, and again pressing at 100 pounds per square inch and a temperature of 163° C. for two minutes, leaving about one inch of the combined laminate unpressed to facilitate subsequent stripping. The samples are stripped apart on an Instron tensile testing machine operating at a draw rate of twelve inches per minute. The force necessary to peel the film from the fabric in all cases is less than one pound per inch of width.

A similar series of seven preformed vinyl resin films in which the vinyl resin is approximately 97% vinyl chloride and 3% vinyl acetate and the compounding ingredients and pigments are varied to provide clear, colored, and opaque films are also laminated to the same nylon fabric and tested as above. The adhesion values range from 2.8 to 4.2 pounds per inch of width.

In another illustration of adhesive strength, a solution of 100 parts of VMCH resin and 75 parts of dioctyl phthalate in 200 parts of methyl ethyl ketone are spread on one side of the above-described nylon fabric and the treated fabric dried at 175° C. for two minutes. The amount of dry solids applied is 25% of the fabric weight. The treated face of the fabric is then laminated to a clear vinyl chloride-vinyl acetate copolymer film from the above series using the same procedure for laminating and testing. The adhesion value is 7.5 pounds per inch of width.

The following examples illustrate specific embodiments of the invention and compare with similar articles of the prior art. All parts and percentages are by weight unless otherwise indicated.

EXAMPLE 1

100 parts by weight of VMCH resin (a copolymer of about 86% vinyl chloride, 13% vinyl acetate and 1% maleic acid) are gradually stirred into a solution consisting of 200 parts of methyl ethyl ketone and 75 parts of dioctyl phthalate. After the resin is completely dissolved, 40 parts of 99.4% methylene bis(4-phenyl isocyanate) are added and the mixture is stirred for 30 minutes. The The adhesive prepared in this way is applied to one side of the said nylon fabric by means of a coating rod, and the coated fabric dried in a circulating air oven at 175° C. for two minutes in order to evaporate the solvent and cure the adhesive solids to the fabric. The amount of dry adhesive solids on the treated fabric is 32.8% of the original weight of the fabric. A clear compounded vinyl resin film (Bakelite KDA–2900) is placed on the treated surface of the fabric and laminated thereto by pressing in a hydraulic press at a temperature of 163° C. and a pressure of 100 p.s.i. for one minute. The vinyl resin comprises 97% vinyl chloride and 3% vinyl acetate.

To measure the adhesion of the film to the fabric two strips one inch x eight inches are cut from the laminate, the vinyl film surface of each is moistened with tetrahydrofuran, the two moistened surfaces placed together, and the whole pressed for 16 hours at a pressure of 100 p.s.i. at 25° C. after which it is dried at 110° C. for one hour under a pressure of one-half pound per square inch. About 1 inch of the strips is not moistened with solvent in order to facilitate pulling the strips apart. The two strips are peeled apart on an Instron tensile tester at a draw separation rate of 12 inches per minute. A force of 31 pounds per inch of width is required to peel the vinyl film from the fabric.

EXAMPLE 2

The adhesives of Table I are prepared in the same manner as the formulation in Example 1. The letters DOP, MEK, and MDI in the table represent dioctyl phthalate, methyl ethyl ketone, and methylene bis(4-phenyl isocyanate) respectively. VMCH resin is a copolymer prepared from about 86% vinyl chloride, 13% vinyl acetate and 1% maleic acid. The adhesives are applied to the nylon fabric described above fifteen minutes after the diisocyanate is added. Otherwise the procedures and materials and testing method are the same as those in Example 1. The amount of adhesive applied to the fabric is 24% of the original dry weight of the fabric. The strip adhesive force required to peel the films from the fabric is shown in the table.

Table I

|  | I | II | III |
|---|---|---|---|
| VMCH Resin _____ parts__ | 100 | 100 | 100 |
| DOP _____ do____ | 60 | 60 | 60 |
| MEK _____ do____ | 300 | 300 | 300 |
| MDI _____ do____ | 40 | 30 | 20 |
| Strip Adhesion, lbs. per in. of width_____ | 27 | 23 | 30 |

EXAMPLE 3

The adhesives of Table II are prepared in the manner of Example 1.

The materials and procedures for adhesive coating and laminating are the same as in Example 1. The average dry adhesive applied to the fabric is 28.8%. Strip adhesion test specimens are prepared by cutting each of the vinyl-nylon fabric laminates in half and pressing the two halves together (vinyl-to-vinyl) at 163° C. and 100 p.s.i. for two minutes, leaving about one and one-half inches of one end unpressed to facilitate subsequent stripping. Test strips, 1" x 8", are cut from the pressed laminates and tested for strip adhesion on the Instron tester. Strip adhesion is shown in Table II.

Table II

|  | #1 | #2 | #3 | #4 |
|---|---|---|---|---|
| VMCH _____ | 100 | 100 | 100 | 100 |
| DOP _____ | 60 | 60 | 60 | 60 |
| MEK _____ | 200 | 200 | 200 | 200 |
| MDI _____ | 10 | 15 | 20 | 30 |
| Strip Adhesion, lbs. per in. of width___ | 29 | 29 | 28 | 28 |

EXAMPLE 4

The adhesives of Table III are prepared in the same manner as in Example 1.

These adhesives are applied to one side of the nylon fabric in the manner of Example 1. The amount of adhesive solids applied is 25–26% of the fabric weight. Each adhesive treated fabric is cut in half, the treated surface of each half turned toward that of the other, and two sheets of the clear, preformed vinyl resin compound film of Example 1 inserted between them to form a four layer stack. This assembly is pressed at 100 pounds per inch at 163° C. for two minutes, leaving about one and one-half inches unpressed to facilitate subsequent stripping. Test strips from the pressed laminates are stripped apart as in Example 1. The force required to separate the film from the fabric is shown in the table. In a similar separate experiment utilizing the VYNS resin without isocyanate, an adhesion value of 4 lbs. is observed.

Table III

|  | #1 | #2 | #3 | #4 | #5 |
|---|---|---|---|---|---|
| VMCH _____ | 100 | 100 | 100 |  |  |
| VYNS _____ |  |  |  | 100 | 100 |
| DOP _____ | 60 | 60 | 60 | 60 | 60 |
| MEK _____ | 200 | 200 | 200 | 400 | 400 |
| MDI _____ | 0 | 5 | 10 | 10 | 60 |
| Strip Adhesion, lbs. per inch of width__ | 7.6 | 21 | 22.2 | 11 | 15 |

This example shows clearly that, with adhesive resin of this invention, addition of as little as 5 parts of diisocyanate results in a great improvement in adhesion. With the VYNS resin which does not contain a copolymerized unsaturated carboxylic acid, the effect of the diisocyanate is much smaller and adhesion is not as good even with as much as 60 parts of diisocyanate.

EXAMPLE 5

An adhesive containing 100 parts VMCH, 60 parts DOP, 200 parts MEK, and 5 parts MDI is prepared in the same manner as in Example 1 except that a crude diisocyanate, 87% methylene bis(4-phenyl isocyanate), the remainder impurities, is used.

The adhesive treating, laminating and testing procedures are the same as those in Example 4. The amount of dry adhesive on the fabric is 25% and the strip adhesion is 25 lbs./in.

EXAMPLE 6

An adhesive containing 100 parts VMCH, 60 parts DOP, 200 parts MEK, and 5 parts MDI is prepared in the same manner as in Example 1.

The nylon fabric and adhesive-coating procedure are the same as those in Example 1. The average amount of dry adhesive on the fabrics is 21%. This adhesive treated fabric is laminated to each of a series of 14 commercial vinyl resin composition films, all of which are recommended for lamination to fabric. These films vary widely in color and degree of pigmentation and also in the kind and amount of stabilizers and other ingredients used. The laminating and testing procedures are those of Example 4 except that only one thickness of vinyl film is used. The strip adhesion values obtained are shown in Table IV.

Table IV

| Film | Bakelite Code | Adhesion (Lbs./in. Width) |
|---|---|---|
| Grey Opaque, 6 mil_____ | KDA 2066 | 24.9 |
| Clear, 4 mil_____ | KDA 2066 | 23.1 |
| Yellow Opaque, 4 mil_____ | KDA 2066 | 29.5 |
| Green Opaque, 4 mil_____ | KDA 2066 | 27.0 |
| White Opaque, 4 mil_____ | KDA 2066 | 26.3 |
| Blue Opaque, 4 mil_____ | KDA 2066 | 24.3 |
|  | Firestone Code |  |
| Pink Opaque_____ | FR-2555 | 27.3 |
| Red Opaque_____ | FR-2558 | 18.3 |
| Blue Opaque_____ | FR-2557 | 20.4 |
| Yellow Opaque_____ | FR-1070-PMX | 17.9 |
| White Opaque_____ | FR-1014-PM | 22.5 |
| Brown Opaque_____ | FR-2552 | 16.7 |
| Clear_____ | FR-1000 PMB | 28.0 |
| Clear_____ | FR-1251-D | 34.3 |

The same vinyl resin compound films are also laminated to the same nylon fabric treated with an adhesive containing 100 parts VYNS, 60 parts DOP, 400 parts MEK, and 40 parts MDI. The adhesive coating and laminating procedures and strip adhesion testing are the same as used above. Strip adhesion in all cases is less than 5 lbs.

This example demonstrates that with pigmented vinyl resin compositions adhesives of this invention provide much better adhesion than is obtained with an adhesive based on vinyl resin VYNS, even when the latter contains a high proportion of an isocyanate.

EXAMPLE 7

The same nylon fabric is treated with the VMCH adhesive of Example 6 by the procedure of Example 1 and stored under laboratory conditions of 75° F. and 56% relative humidity. After different periods of storage, the treated fabric is made into laminates using the vinyl film and procedures of Example 4. The adhesive strength values are 20, 24, 26, and 25 pounds per inch of width after 0, 8, 29, and 45 days storage, respectively.

EXAMPLE 8

A woven fabric of "Dacron" polyester fiber made with 220 denier continuous filament yarns in a fabric construction 51 x 52 and weighing 6.8 oz. per sq. yard is treated with the VMCH adhesive formulation of Example 6 and cured as in Example 1. The amount of dry adhesive added is 22% of the dry weight of the fabric. This treated fabric is then laminated to vinyl resin film and tested as in Example 7. A strip adhesion of 29 lbs. is obtained.

EXAMPLE 9

A VMCH adhesive is prepared as in Example 5 except that MDI of 99.4% purity is used. This is applied as in Example 1 to both sides of a fabric made of "Dacron" polyester fiber having continuous filament warp yarns and spun filling yarns weighing 18.2 oz. per sq. yard. A piece of oak-tanned leather is coated with the adhesive, dried at 70° C. for 10 minutes and then coated again with the adhesive. A second piece of the same leather is coated only once with the adhesive. The treated fabric is placed between the two pieces of leather with the adhesive treated surfaces together while the adhesive on the leather is still wet. This sandwich is dried at 70° C. under a light pressure of 0.5 lb. per sq. inch for 20 minutes and then pressed at 25° C. under a pressure of 125 lbs. per sq. inch for 16 hours. The composite structure is then cut into strips one inch wide and tested for strip adhesion as in Example 1, both pieces of leather being separated individually from the "Dacron" polyester fiber fabric. In both cases the leather tears within itself at about 12 lbs. tension and the adhesive bond does not fail.

EXAMPLE 10

A film of poly(hexamethylene adipamide) 5 mils thick is coated with a VMCH adhesive having the same formulation as in Example 6 and then cured as in Example 1. The adhesive-coated nylon film is laminated to vinyl resin film and tested for strip adhesion as in Example 4. A strip adhesion of 17.3 lbs. per inch is obtained.

The polymeric component of the adhesive of this invention is formed by the copolymerization of small quantities of an alpha, beta unsaturated acid with a vinyl halide such as vinyl chloride and a vinyl ester of an aliphatic acid, preferably a lower aliphatic acid such as formic, acetic, propionic, and butyric acids. Particularly desirable are those polymers having from about 0.1% to 10% by weight of the unsaturated acid component, from about 60% to about 95% combined vinyl chloride, the remainder being a vinyl ester, such as vinyl acetate. Preferably, the polymer has a molecular weight of from about 6000 to 25,000. Preferred polymers within this group are those which contain from 0.3% to 3% by weight of the unsaturated acid compound, 80% to 90% of vinyl chloride content by weight, and an average molecular weight of 8000 to 12,000. Such vinyl polymers may be produced in accordance with the teachings set forth in U.S. Patent 2,329,456, issued September 14, 1943, to William E. Campbell, Jr., and the limitations set forth in the disclosure of that patent apply here.

In a preferred embodiment of the invention, the alpha, beta olefinic unsaturated carboxylic acid is maleic acid, but other compounds of this class such as monesters of maleic and fumaric acid, benzyl maleic acid, citraconic acid, itaconic acid, crotonic acid, acrylic acid, and methacrylic acid may be used as well as the free acids.

The isocyanate compound which is a constituent of the adhesive composition may be methylene bis(4-phenyl isocyanate) or any equivalent polyfunctional isocyanate, for example, hexamethylene diisocyanate, decamethylene diisocyanate, metaphenylene diisocyanate, 2,4-toluene diisocyanate, mixed isomers of toluene diisocyanate, polymethylene polyphenyl-isocyanate, triphenylmethane-4,4', 4"-triisocyanate, or the like. More than one isocyanate may be used if desired. Di- and tri-isocyanates in which the —N=C=O groups are attached to aryl or alicyclic groups are preferred, but any isocyanate monomer containing at least two —N=C=O groups may be used.

For convenience in applying the adhesive composition to a fibrous base or textile material, the constituents are preferably dissolved in a suitable volatile solvent, and in most applications a plasticizer for the terpolymer is added. The amount of plasticizer and solvent will be determined by the nature of the fibrous base or textile material and by the temperature and pressure which is to be used in curing the adhesive and in subsequent lamination to the resinous vinyl polymer compound.

The amount of plasticizer used in the adhesive compound may vary depending on the particular plasticizer used and on the character of the adhesive composition desired. In certain instances the plasticizer may be omitted entirely without reducing adhesive strength. A generally suitable range is from 0 parts to 100 parts of plasticizer to 100 parts of terpolymer adhesive resin by weight and between 50 and 75 parts of plasticizer per 100 parts of terpolymer adhesive resin is preferred.

When thorough penetration of the fibrous base or textile material is desired, a lower viscosity adhesive solution is desirable and may be achieved by increasing the amount of solvent and/or plasticizer. Suitable plasticizers include dioctyl phthalate, di(2-ethyl hexyl)phthalate, tricresyl phosphate, 2-ethylhexyl diphenyl phosphate, diisobutyl adipate, butyl benzyl phthalate and others well known to those skilled in the art. Solvents which may be used in this invention include ethylene dichloride, acetone, tetrahydrofurane, and mixtures of such solvents with aromatic hydrocarbons. It is important that the plasticizer and solvent be chosen from those chemical compounds which do not react with the isocyanate or the carboxylic acid groups since such reaction may reduce or destroy the adhesive effect of the composition.

The proportion by weight of the terpolymer to isocyanate in the adhesive may be varied depending on the exact chemical composition of these materials and the degree of adhesion desired. Good adhesion is obtained over the range of 2 parts to 40 parts of isocyanate per 100 parts of terpolymer, and excellent adhesion is obtained over the range of 5 parts to 20 parts of isocyanate per 100 parts of terpolymer. Higher proportions of isocyanate produce even better adhesion and are very useful in applications where cost is of secondary importance.

The procedure for preparing the adhesive solution is not critical, but it is usually more convenient to dissolve the terpolymer resin in the combination of plasticizer and solvent and to add the isocyanate to the other constituents when ready for use. The solution of the adhesive may be used immediately after the isocyanate is thoroughly admixed, or it may be stored for periods up to several days depending on its exact composition.

The solution of adhesive may be applied to the fibrous base or textile by any of the known methods such as dipping, spraying, spreading, roller coating, knife coating, etc. and doctor blades may be used to remove the excess adhesive solution if necessary. The treated product is usually heated in air to flash off solvent and to cure the adhesive solids on the fibrous base or fabric. A temperature of about 175° C. for a period of two minutes is convenient for this purpose, but this time can be extended if lower temperatures are used, or shortened at higher temperatures.

The amount of solid adhesive composition applied to the fibrous base or textile depends on the product desired. For bonding together individual fibers in a batt or paperlike structure 5% to 30% of the adhesive resin compound based on the dry weight of the textile base is sufficient. If it is desired to treat a woven fabric to provide excellent adhesion to a vinyl resin coating compound, 0.25 to 3 oz. of adhesive solids per square yard of fabric may be applied to each side which is to be coated. To obtain best results, 0.5 to 1 oz. of adhesive solids per square yard of fabric is applied to each side of a fabric and later covered with a vinyl resin coating composition.

The vinyl resins used as a coating may be selected from a variety of vinyl chloride polymers and copolymers, including copolymers of vinyl chloride and other ethylenically unsaturated monomers, e.g., copolymers of vinyl chloride with esters of acrylic or methacrylic acids; copolymers of vinyl chloride and vinyl esters, e.g., vinyl acetate, as well as the homopolymer of vinyl chloride. In the case of the vinyl chloride copolymer resins, the vinyl chloride is present in amounts at least about 75% of the total polymer composition. The vinyl chloride resinous composition may contain plasticizers, lubricants, stabilizers, pigments and other colorants as desired.

The vinyl chloride coating composition may be preformed into a film of suitable thickness by known methods such as calendering or casting. In this case, it is desirable that both the preformed film and the fibrous base or textile coated with the adhesive composition be preheated before they are brought together and pressed between heated rolls. Other conventional practices for securing good lamination such as moistening the preformed film or the adhesive compound treated fabric with solvents or resin solutions may also be used. Alternatively, the vinyl resin coating composition may be applied to the adhesive treated fabric by calendering or in the form of a plastisol or organosol by known methods.

The adhesive composition of this invention provides good to excellent adhesion to polyvinyl resin coating compositions varying widely in polymer composition and in compounding ingredients, colorants, and pigments while permitting improvement in the durability and aesthetic properties of the coated material. The adhesion so provided is much more resistant to heat or moisture deterioration than that produced with known adhesive compositions.

The importance of the high levels of adhesive strength obtainable with this invention is particularly demonstrated in end uses where the laminate is subjected to flexing, vibration, chafing or other mechanical abuse. An outstanding example of such service is in tarpaulins for covering open-bodied trucks and trailers. In the past many attempts have been made to produce such tarpaulins from closely woven fabrics of continuous filament synthetic fibers coated with vinyl resin compounds, to achieve the excellent mechanical properties of such fabrics and the resistance to weathering of the vinyl resins. These have failed primarily because of poor adhesion which results in delamination early in service life. The closest approach has been to use open weave fabrics (generally known as "scrims") and even with these it is impractical to put the whole resinous coating on one side, as is technically and economically desirable. It is necessary to apply the resinous compound to both sides and to force the two coatings to merge through the interstices of the fabric. In such products the adhesion is largely of resin to resin and only in a minor degree that of resin to fiber. However, through the practice of the present invention it is now practical to utilize the stronger, more durable and more easily processed closely woven fabrics, to apply the vinyl resin compound to only one or to both sides as desired, and in each case to obtain sufficiently good adhesion for satisfactory and economical service life.

The use of small amounts of polyfunctional isocyanates in achieving excellent adhesion is a distinct advantage of the composition of this invention because of the high cost of these isocyanates and the instability of solutions containing large amounts of these compounds.

Although the advantages of this invention will be particularly realized in the relatively thin and flexible structures commonly called coated fabrics, combined fabrics, supported films and the like, they are by no means limited to such structures. They are also useful in multilaminates having many layers of fibrous bases or textiles separated by resinous compounds and combined with heat and pressure to form flexible or rigid structures or shaped articles. Laminates of films or textiles to other bases are also improved by the practice of this invention.

Although described primarily as applicable to formed textile structures, this invention also contemplates the application of our preferred adhesive compositions to fibers, filaments, or yarns prior to forming them into structures, in cases where such practice is advantageous.

The claimed invention:

The process for producing a laminated article which comprises preparing a solution in methyl ethyl ketone solvent of 100 parts by weight of vinyl chloride:vinyl acetate:maleic acid interpolymer, about 50 to about 75 parts by weight of dioctyl phthalate plasticizer and about 5 to about 40 parts by weight of methylene bis(4-phenyl isocyanate), said interpolymer consisting of about 86% vinyl chloride, 13% vinyl acetate and 1% maleic acid, applying the solution to nylon fabric to form an adhesive coating which weighs when dry about 30% of the original weight of the fabric, heating the coated fabric at a temperature between 160° and 200° C. for at least one minute to remove the solvent and cure the adhesive, and bonding a vinyl chloride:vinyl acetate copolymer film to the cured adhesive with heat and pressure.

References Cited in the file of this patent

UNITED STATES PATENTS

| | | |
|---|---|---|
| 2,606,845 | Van Etten | Aug. 12, 1952 |
| 2,766,164 | Salem | Oct. 9, 1956 |
| 2,837,458 | Coleman | June 3, 1958 |
| 2,886,467 | Lavanchy et al. | May 12, 1959 |
| 2,929,737 | Tischbein et al. | Mar. 22, 1960 |
| 2,938,823 | Salem et al. | May 31, 1960 |

FOREIGN PATENTS

| | | |
|---|---|---|
| 887,856 | Germany | July 8, 1949 |
| 638,118 | Great Britain | May 31, 1950 |
| 1,046,368 | France | Dec. 7, 1953 |

OTHER REFERENCES

"Rubber Age," vol. 67, No. 5, August 1950, pp. 553, 560.